March 9, 1937.  R. C. GREENE  2,073,058
VEHICLE
Filed May 5, 1936   2 Sheets-Sheet 1

INVENTOR
REGINALD CHARLES GREENE
BY
ATTORNEY

March 9, 1937.  R. C. GREENE  2,073,058
VEHICLE
Filed May 5, 1936  2 Sheets-Sheet 2
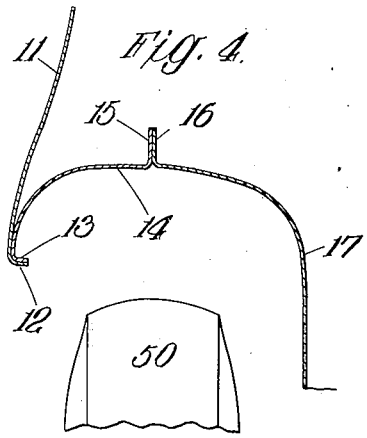
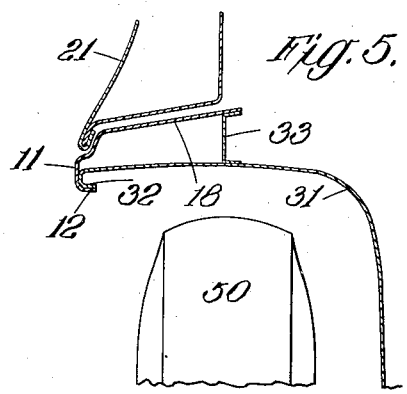
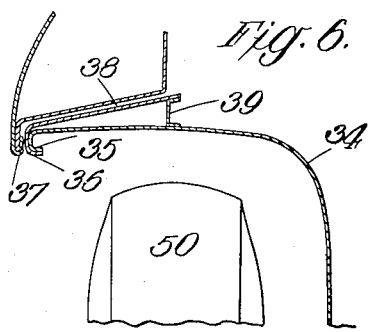
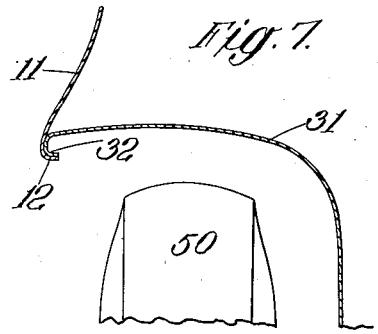
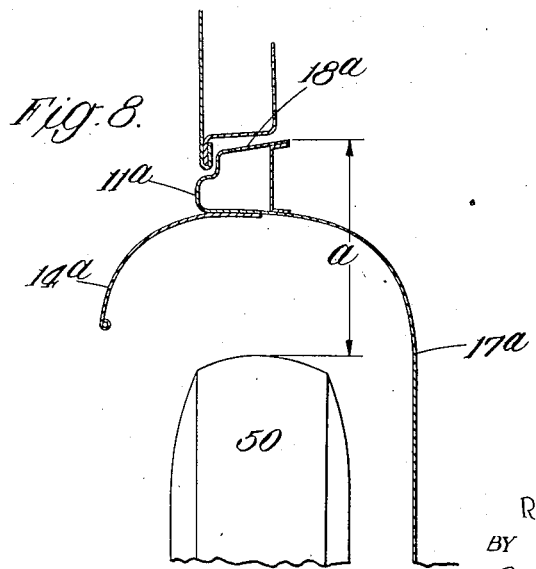
INVENTOR.
REGINALD CHARLES GREENE
BY
John P. Tarbox
ATTORNEY.

Patented Mar. 9, 1937

2,073,058

UNITED STATES PATENT OFFICE 2,073,058

VEHICLE

Reginald Charles Greene, Oxford, England, assignor to Pressed Steel Company Limited, Oxford, England, a British company Application May 5, 1936, Serial No. 77,962
In Great Britain May 8, 1935

6 Claims. (Cl. 296—28)

The present invention relates to automobile bodies and is adaptable particularly to bodies comprised of a plurality of metal stampings, such a body comprising for example, two one-piece side-wall stampings, each including door and window openings, a rear or tonneau stamping and a front or shroud stamping, all the said stampings being suitably reinforced, for example, the lower margins of the side-wall stampings being reinforced by sill plates to present a box-section structure adapted to rest on, and to be secured to, the chassis-frame side sills, or to constitute the underframe structure of a self supporting body. In constructions of this kind each side-wall stamping is formed with a depression to present a rear wheel-arch housing, or has a wheel arch stamping secured thereto, the lower margins or threshold portions of the side stampings being contoured to follow the contour of the wheel. Such contouring necessitates a restriction, in the case of a four-door sedan, of the rear door opening and this restriction is a disadvantage, in that it hinders the easy entry of passengers to the rear seats of the body. Similarly in cases of built-up all steel bodies and bodies of the so-called composite type, this restriction of the rear door opening is evident and disadvantageous.

Furthermore, in order to give ample clearance for the easy mounting and removal of the rear wheels, it has been found necessary to provide in each side-wall or tonneau stamping (of, for example, an all-steel body) a large clearance to accommodate the rear fender and this large clearance further restricts the rear door opening.

The object of the present invention is to provide an improved body structure in which the aforesaid disadvantages are reduced to a minimum.

This is achieved by eliminating the rear fenders as known at the present time and providing a guard for the rear wheels, formed integrally with, or secured to, each side wall or tonneau stamping. Where the guard proper is secured to the body stamping it may take somewhat of the form of the known rear fender, but of shallower depth and preferably secured directly to, and serving as a reinforcement for, the side wall or tonneau stamping. The rearward extension of the threshold portions or lower margins of each side-wall stamping (where a unitary side-wall stamping is employed) in those regions where they follow the contour of the wheel, or the wheel arch framework may be of reduced cross-section such that, in conjunction with the rear wheel guard proper a shallow box-section framework is presented defining the wheel arch and also the outer contour of the body. The usual wheel housing depression may be formed integrally with the side wall or tonneau stamping as before, or may be formed as a separate stamping welded, or otherwise secured to, the side-wall or tonneau stamping, in the region of the contoured box section wheel housing framework.

Since the lower margins of the side-wall or tonneau stamping are secured to the rear wheel guard, it may be desirable to flare the side wall or tonneau stamping outwardly in said lower margins to an extent corresponding with the normal outer edge of the rear fender, although it is of course equally possible to provide a wider body shell, not required to be so flared. In those cases, however, where it is desirable to flare the lower margins of the side-wall or tonneau stamping, the door stamping may be similarly flared in its lower margins, so as not to interrupt the smooth outer contour of the body as a whole.

A further advantage of the construction described in the foregoing is that the rear door in addition to overlapping and covering the normal threshold portion of the body side wall further overlaps completely the rearward upwardly directed extension of the threshold portions or wheel arch framework to the contour of the wheel arch housing and this construction precludes the possibility of mud collecting, as is common in vehicles today on the forwardly facing portions of the rear fenders, thereby giving access to the rear seats of the vehicle without the possibility of soiling by muddying the clothing of a person entering to the said seats.

The invention will now be described by way of example, with reference to the accompanying drawings, of which, Figure 1 is a side elevation of a complete vehicle body in which is incorporated the invention;

Figure 2 is a section on the line 2—2 of Figure 1;

Figure 3 is a section on the line 3—3 of Figure 1;

Figure 4 is a section on the line 4—4 of Figure 1;

Figure 5 is a figure similar to Figure 2 but of a modification of the invention;

Figure 6 shows yet a further modification;

Figure 7 is a section similar to Figure 3 of the modification shown in Figures 5 and 6;

Figure 8 is a section similar to the section of

Figure 2 but of a vehicle body of known construction, this figure being included for the purpose of indicating the advantages of the present invention.

Figure 1:
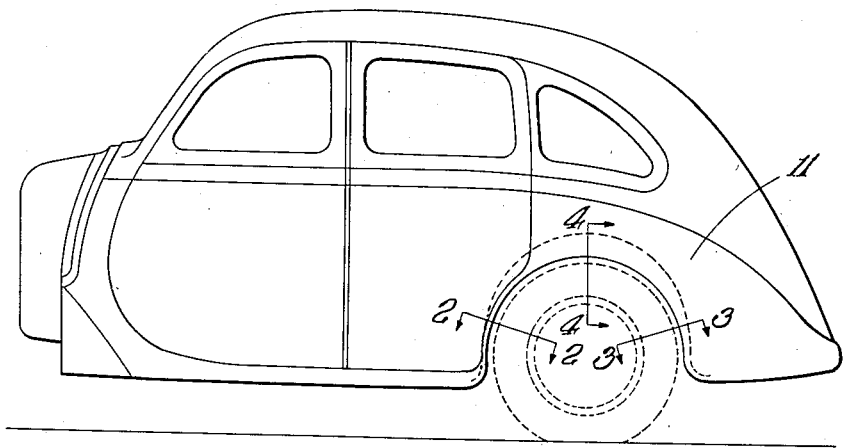
Figure 1:
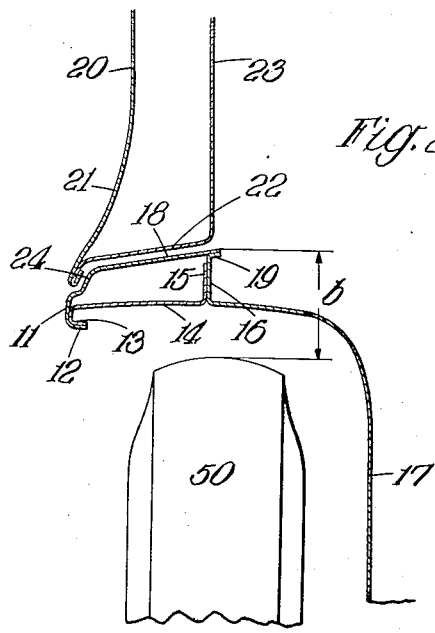
Figure 1:
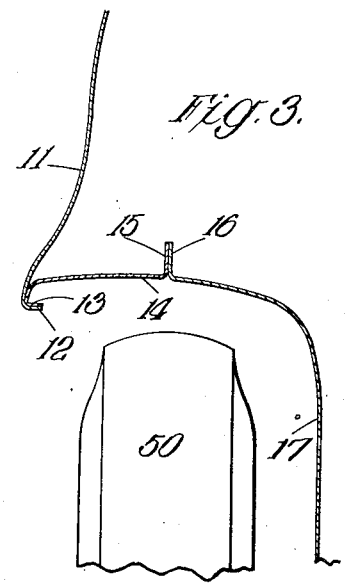

Referring particularly to Figures 1 and 2 the outer panel 11 is formed in its lower margins with an outward sweep, its lowermost edge 12 being flanged inwardly to nest with, and to be secured to, as by e. g. spot welding, an inturned flange 13 of the wheel arch outer panel 14, which panel 14 is secured, by e. g. spot welding, through its upstanding flange 15 with an upstanding flange 16 of the wheel arch inner panel 17. In the threshold portions of the body the outer panel 11 is directed inwardly as at 18 and secured by welding to the portion 19 of the flange 16 of the wheel arch inner panel 17, the threshold portions so formed presenting a strong and stiff box section structure.

It is to be observed that the doors for a body of this invention require that the outer door panel 20 is swept outwardly as at 21 in its lower margins and secured to the bottom rail 22 of the inner door panel 23. The line of the door being more or less continuous with the outer panel 11, its bottom edge overlapping the rabbet 24 of the box section threshold sill.

In order clearly to show that the structure of this invention provides a less restricted door opening and a wheel arch structure more closely situated adjacent the wheel itself, comparison should be made with Figure 8 which shows an outer panel 11a with which is formed integrally the wheel arch panel 17a, a fender or mudguard 14a being attached to the wheel arch panel 17a. The outer panel 11a is formed with threshold portions 18a and it is to be observed that the distance between the top of the threshold sill and the top of the wheel 50 represented by the letter a is considerably greater than the corresponding distance represented in Figure 2 by the letter b.

At the crown of the wheel arch structure the outer wheel arch panel 14 is secured through its flange 15 to the flange 16 of the inner wheel arch panel 17 which structure is continuous to the bottom rear edge of the body.

In Figure 5 the outer panel 11 is of the same form as that shown in Figure 2 but the wheel arch panel 31 is formed of a single stamping extending outwardly to and secured through its flange 32 to the inturned flange 12 of the outer panel 11, the box section structure in this case being completed by the channel section wheel arch spacer 33. Yet a further alternative is shown in Figure 6 wherein the wheel arch panel 34 is connected through its flange 35 with the flange 36 of the outer panel 37. The outer panel in this case being formed in its threshold portions without a rabbet for the bottom edge of the door which is arranged to overlap directly the outer panel 37, the threshold portion 38 of which is secured to the wheel arch panel 34 by the wheel arch spacer 39.

Figure 7 is a section similar to Figure 3 in which the wheel arch panel 31 is formed in one piece to be secured through its flange 32 to the flange 12 of the outer panel 11, this figure corresponding with the construction of Figures 5 and 6.

By means of the present invention the overall thickness of the wheel arch framework and the rear wheel guard is reduced by substantially one half, such reduction of course permitting of a greater rear door opening by the amount of such reduction, and thereby facilitating ingress and egress to and from the rear of the body.

Furthermore the construction is adaptable very readily to forms of body based on aerodynamic designs in enabling a very clean and uninterrupted outer contour of the side walls of the body to be achieved.

I claim:—

1. In a vehicle body, the combination with a sheet metal side wall or tonneau stamping having, in the wheel housing region, its lower margin located outwardly of the wheel plane and formed with an inwardly extending flange, of a sheet metal wheel housing panel having its outer margin secured directly to said flange and serving simultaneously as a fender or mudguard for the rear wheel and as a strong reinforcement for the said side wall or tonneau stamping providing in effect a hollow cross-section arched frame member conforming generally to the contour of the fender or mudguard.

2. In a vehicle body according to claim 1, in which the sheet metal wheel housing panel is formed in its margin with an inwardly facing channel formation the lower side wall of the channel overlapping and being secured to said stamping flange.

3. In a vehicle body according to claim 1, in which the sheet metal wheel housing panel is formed in its margin with an angular formation, the arms of which are arranged to nest with the angle formed by the body of said stamping and its edge flange and be secured thereto.

4. In a vehicle body according to claim 1, in which the side wall of tonneau stamping is formed in the wheel housing region with an inwardly extending threshold portion and the crown of the wheel housing panel in this region is relatively flat in transverse section, the stamping and panel being joined along the inner margin of said threshold portion by bridging means forming a vertically shallow box-section structure.

5. In a vehicle body according to claim 1, in which the reinforcing wheel housing panel comprises a relatively shallow transverse portion conforming generally in longitudinal section to the form of the usual fender but of substantially shallower depth than the usual fender particularly in the portion thereof flanking the rear door opening, the inner margin of said transversely extending portion being extended downwardly to form the generally vertically extending inner wall of the wheel housing.

6. A vehicle body according to claim 1, in which the side wall or tonneau stamping and the wheel housing panel in the region where they flank the rear door opening are constituted a shallow but relatively wide box-section structure by an angular member joining them inwardly of their outer joined margins.

REGINALD CHARLES GREENE.